United States Patent Office 3,702,131
Patented Nov. 7, 1972

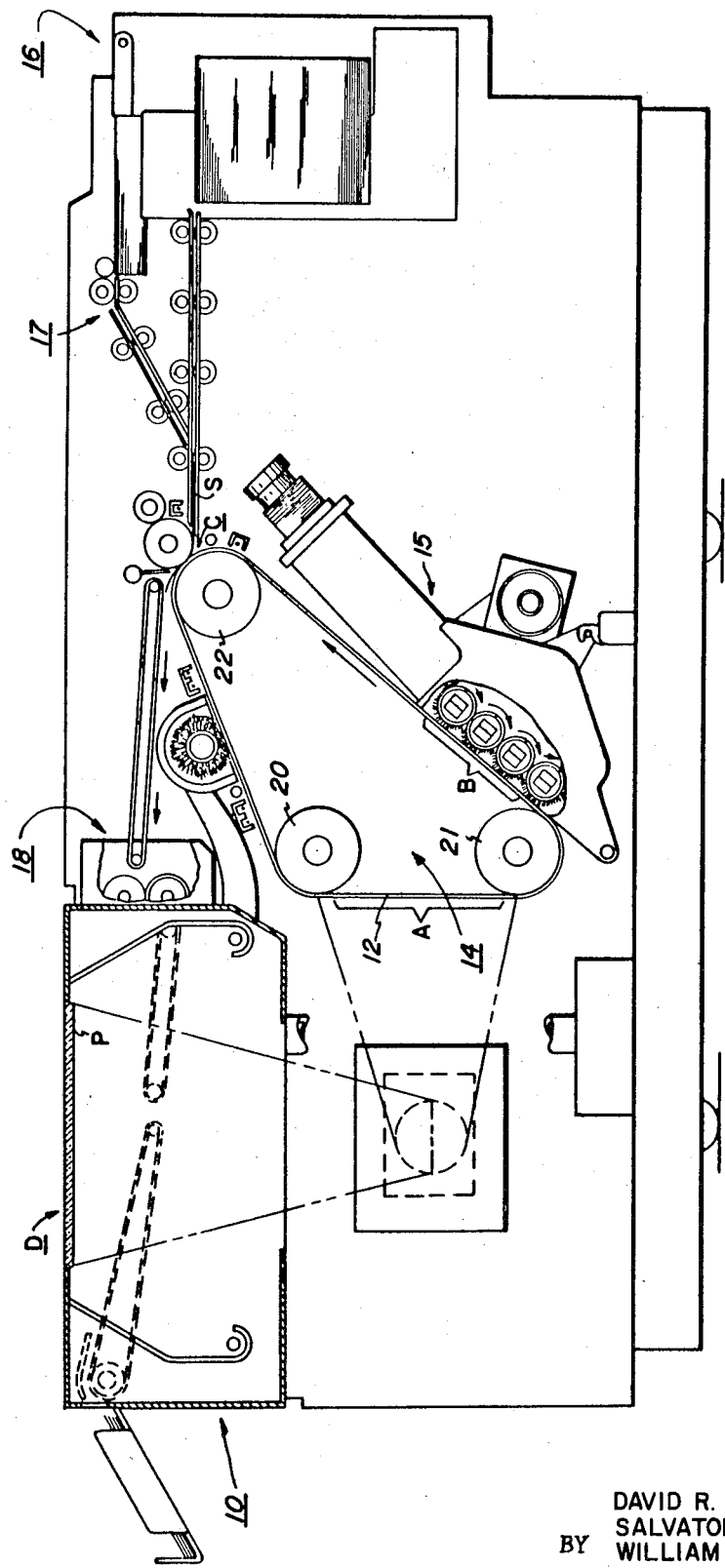

3,702,131
BELT TRACKING SYSTEM
David Roth Stokes, Webster, Salvatore Latone, Rochester, and William E. Jordan, Penfield, N.Y., assignors to Xerox Corporation, Stamford, Conn.
Filed Dec. 29, 1970, Ser. No. 102,311
Int. Cl. B65g 15/62
U.S. Cl. 198—202
8 Claims

ABSTRACT OF THE DISCLOSURE

A belt tracking arrangement for use with a belt supporting roller in a belt assembly employing at least three rollers wherein the shaft for the roller is mounted for short pivotal movement about a control axis normal to its axis and which lies in a plane that bisects the angle of the belt runs on either side of the roller. The roller shaft is mounted between the legs of a yoke which has its axis of rotation in coincidence with the control axis.

---

This invention relates to belt transport apparatus and particularly, to improvements in a belt tracking system for an endless photoreceptor belt. The tracking system arranged in accordance with the present invention is particularly adapted for use with selenium belts in automatic copiers/reproducers that are constructed for high speed operation and capable of having their sequence timing varied thereby permitting variable speeds of output.

In order to overcome many disadvantages for high speed copying, the latest machine concept for copiers utilizes flash exposure of a document and the arrangement of a moving photoconductor material in the form of an endless belt held in a flat condition at the instant of exposure. However, the use of photoconductor belts require extreme care since these belts are very delicate, are easily damaged and the movement thereof through processing stations in a reproduction machine must be accomplished with high precision and with as little irregular movement as possible.

It is therefore, the principal object of this invention to improve copiers/reproduction machines of the type having a belt form of photoreceptor by maintaining belt travel in accurate alignment with a predetermined path of movement.

Another object of this invention is to improve the ability of belt handling apparatus for controlling precise movement of the belt during continuous movement thereof.

Another object of this invention is to improve belt tracking mechanisms for an endless belt by producing corrective tracking which will produce minimum strain upon the belt.

These and other objects of this invention are obtained by means of a belt tracking arrangement applied to one of the rollers in an endless belt system wherein the roller has its entry and exit runs at an angle less than 180°. The roller is mounted for rocking movement on a control axis within the plane of the bisector of the angle formed by the two runs. The roller shaft is mounted at its ends on the arms of a support yoke member which is adapted to be rotated in either direction on an axis which is in the bisector plane and normal to the roller shaft.

For a better understanding of the invention as well as other objects and further features thereof, reference is had to the following detailed description of the invention to be read in conjunction with the accompanying drawings wherein:

FIG. 1 is a schematic sectional view of an electrostatic reproduction machine showing the various processing stations;

Figure 2:
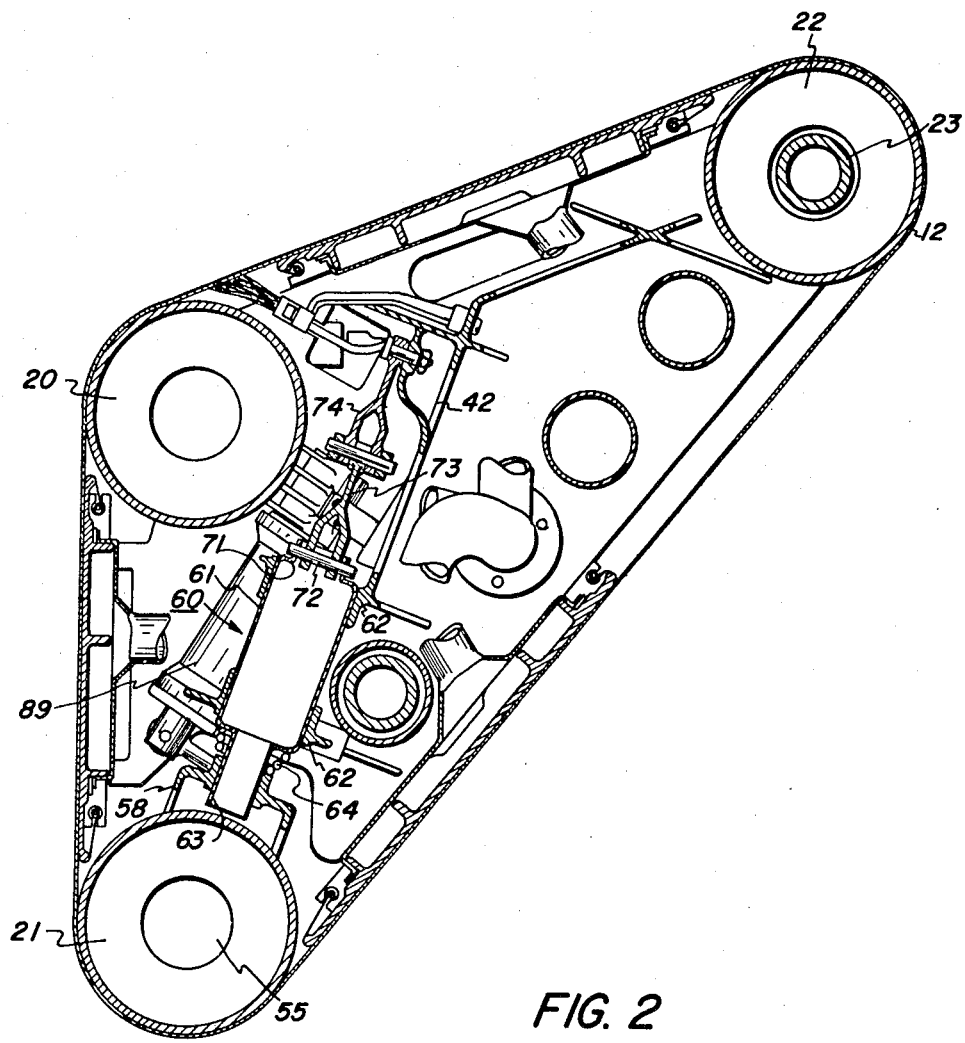
FIG. 2 is a partial cross-sectional view of a belt assembly as seen from the front of the machine.

For a general understanding of the illustrated copier/reproduction machine, in which the invention may be incorporated, reference is had to FIG. 1 in which the various system components for the machine are schematically illustrated. As in all electrostatic systems such as a xerographic machine of the type illustrated, a light image of a document to be reproduced is projected onto the sensitized surface of a xerographic plate to form an electrostatic latent image thereon. Thereafter, the latent image is developed with an oppositely charged developing material to form a xerographic powder image, corresponding to the latent image on the plate surface. The powder image is then electrostatically transferred to a support surface to which it may be fused by a fusing device whereby the powder image is caused permanently to adhere to the support surface.

In the illustrated machine, an original to be copied is placed upon a transparent support platen P fixedly arranged in an illumination assembly generally indicated by the reference numeral 10, arranged at the left end of the machine. While upon the platen, an illumination system flashes light rays upon the original thereby producing image rays corresponding to the informational areas on the original. The image rays are projected by means of an optical system for exposing the photosensitive surface of a xerographic plate in the form of a flexible photoconductive belt 12 arranged on a belt assembly generally indicated by the reference numeral 14.

As will be described below, the photoconductive belt assembly 14 is slidably mounted upon two support shafts one of which is secured to the frame of the machine and is adapted to drive a belt 12 in the direction of the arrow at a constant rate. During this movement of the belt, the reflected light image of an original on the platen is flashed upon the xerographic surface of the belt to produce electrostatic latent images thereon at an exposure station A.

As the belt surface continues its movement, the electrostatic image passes through a developing station B in which there is positioned a developer assembly generally indicated by the reference numeral 15 and where the belt is maintained in a flat condition. The developer assembly 15 provides development of the electrostatic image by means of multiple magnetic brushes as the same moves through the development zone B.

The developed electrostatic image is transported by the belt to a transfer station C whereat a sheet of copy paper is moved between a transfer roller and the belt at a speed in synchronism with the moving belt in order to accomplish transfer of the developed image solely by the electrical bias on the transfer roller. There is provided at this station a sheet transport mechanism generally indicated at 16 adapted to transport sheets of paper from a paper handling mechanism generally indicated by the reference numeral 17 to the developed image on the belt at the station B.

After the sheet is stripped from the belt 12, it is conveyed into a fuser assembly generally indicated by the reference numeral 18 wherein the developed and transferred xerographic powder image on the sheet material is permanently affixed thereto. After fusing, the finished copy is discharged from the apparatus at a suitable point for collection externally of the apparatus.

Drive means is arranged to drive the selenium belt 12 in conjunction with timed flash exposure of an original to be copied, to effect image development, to separate and feed sheets of paper and to transport the same across the transfer station C and to convey the sheet of paper through the fuser assembly in timed sequence to produce copies of the original.

Figure 4:
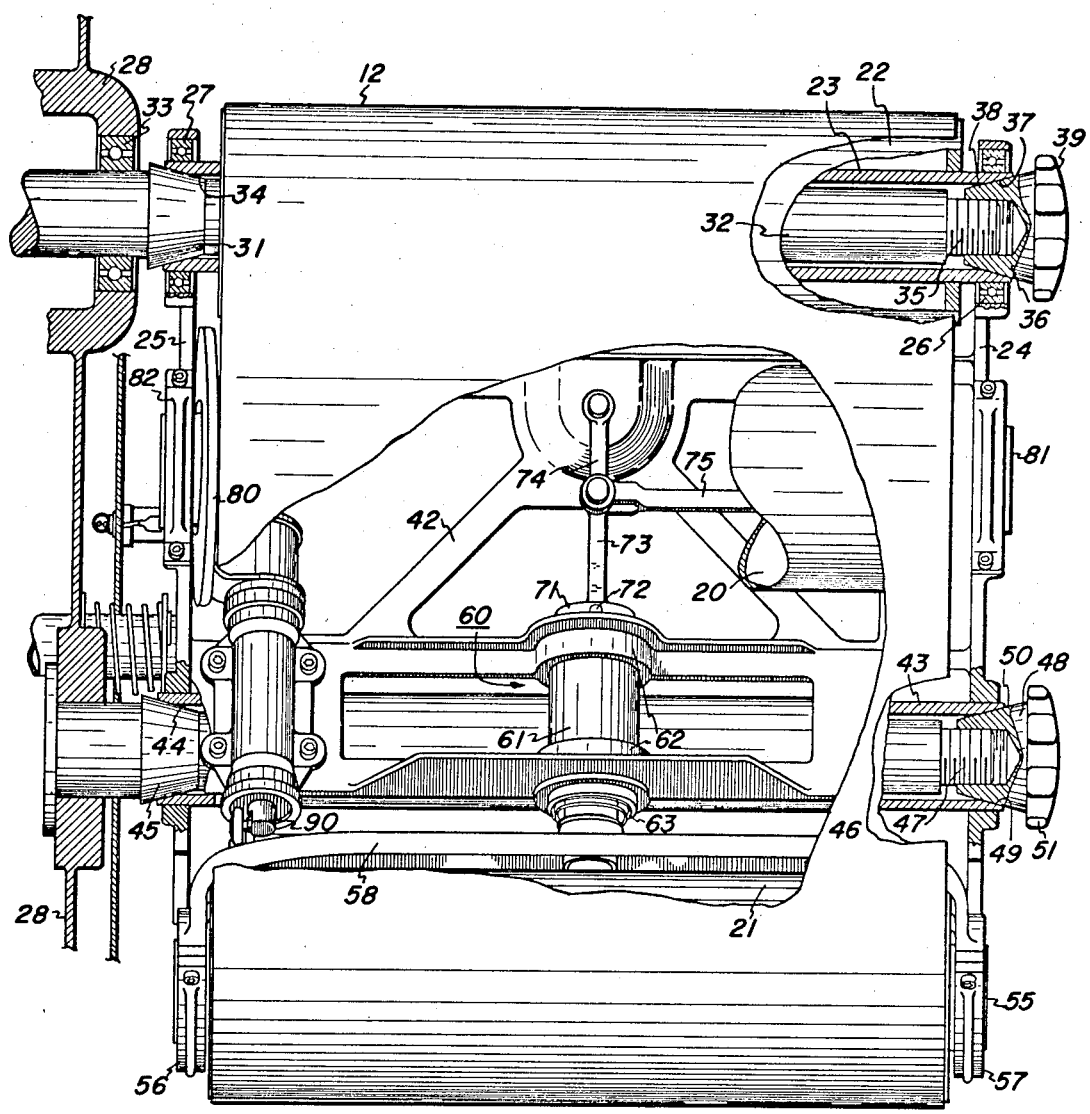
FIG. 4 is a partial sectional view of the belt assembly from the side of the machine with the belt mounted thereon partly in section to show various internal parts.

The belt 12 comprises a photoconductive layer of selenium which is the light receiving surface and imaging medium for the apparatus, on a conductive backing. The belt is journaled for continuous movement upon three rollers 20, 21 and 22 located with parallel axes at approximately the apex of a triangle. During exposure of the belt 12, the portion thereof being exposed is that part of the belt run between the roller 20 and the lower roller 21. As shown in FIG. 4, the photoconductive belt assembly 14 is illustrated with the photoreceptor belt 12 partially broken away removed in order to illustrate the assembly mechanisms located adjacent the belt.

The upper roller 22 is rotatably supported on a hollow shaft 23 journaled in two side plates 24 and 25, each having the general configuration of a triangle. The upper apex of the side plate 24 is formed with an opening for containing and supporting a bearing 26 which rotatably supports one end of the shaft 23. At the other end, the shaft 23 is journaled in a bearing 27 supported at the upper apex for the side plate 25 in the same manner. Positioned within and along the hollow shaft 23 and projecting through a machine support frame plate 28 there is a drive shaft 30 formed with a conical element 31 and a reduced diameter extension 32. The drive shaft is supported on the frame by a bearing 33 mounted in the frame and is connected to a drive mechanism (not shown). The conical element 31 is axially fixed and extends outwardly from the frame 28 so as to be mated with an inwardly tapered or chamfered end 34 of the hollow shaft 23 when the belt assembly is mounted on the frame. At the other end of the hollow shaft 23, the drive shaft 30 terminates in a threaded shank 35 which cooperates with a locking member 36 formed with a conical portion 37 adapted to mate with an inwardly chamfered surface 38 of the outer end of the hollow shaft 23. The locking member is also formed with a rotary hand-operated knob 39 for facilitating easy removal of the member for purposes to be described below.

The purpose for the extended drive shaft 32 is to aid in supporting, as will be described below, and for rotating the roller 22 and, consequently the belt, when the belt assembly 14 is in operating position; that is, when the side plate 25 is positioned against the main frame plate 28. This arrangement also permits the easy removal of the belt assembly 14 from the machine frame.

The side plates 24 and 25 are maintained in parallel planes and rigidly supported in spaced relation for supporting the rollers 20, 21 and 22 and all of the other structures that comprise the belt assembly 14 by internal structural plates 42 and also by the hollow shaft 23 by virtue of the ends of this shaft being fixed to the inner races of the bearings 26, 27. The plates 24 and 25 are also spaced and held in position by a hollow shaft 43 which is identical to the rotatable hollow shaft 23 except that its ends are secured to the side plates, and does not rotate. At the end adjacent the frame plate 28, the shaft 43 is chamfered at 44 and arranged for cooperation with the conical portion 45 of a support shaft 46 positioned axially in the hollow shaft 43. The shaft 46 is secured to the frame 28 and has its outer end formed as a threaded position 47 which cooperates with a locking member 48. This member is identical to the locking member 36 and is provided with an inwardly tapering or conical portion 49 which is cooperable with an inwardly chamfered surface 50 formed at the outer end of the hollow shaft 43. A knob 51 on the member 36 allows manual locking of the inner shaft 46 relative to and within the hollow shaft 43. From the foregoing, it will be understood that the belt assembly 14 is mounted in a cantilever fashion on the frame support plate 28 by means of the hollow shafts 23 and 43, and that by virtue of the use of tapered or conical portions 31, 37 in the case of the shaft 23 and the conical portions 45, 49 in the case of the shaft 43, the belt assembly is adapted to be accurately positioned in its required location after movement of the assembly from the frame 28. It will be appreciated that this structure allows quick and easy removal and replacement of the belt assembly upon the frame while still providing means for driving the belt and permit removal of the belt 12 from its supporting assembly.

The belt assembly 14 is provided with an arrangement for tracking the belt 12 in the event it deviates laterally in either direction during its movement around the rollers 20, 21, 22. The arrangement includes the mounting of the roller 21 for rocking movement and an edge guiding device associated with the roller 20 for producing the rocking movement of the roller 21 in response to lateral deviation of the belt.

As shown in FIGS. 2 and 4, the roller 21 is secured to a shaft 55 journaled in bearings secured to the ends of the parallel legs 56, 57 of a yoke member 58. At the midpoint of the yoke member and extending in an opposite direction relative to the legs 56, 57, there is mounted a shaft 60 which serves to support the yoke member for limited rocking movement about the axis of this shaft and to permit slight retraction. The shaft 60 is preferably in the form of a cylinder 61 of relatively large diameter and being rotatably mounted in spaced bearings 62 mounted on the frame 42 and having a coaxial reduced portion 63 secured to the lower cylinder 61 and secured within a suitable opening formed in the bight portion of the yoke member 58. A relatively heavy coil spring 64 encircles the portion 63 between the yoke member and the lower surface of the lower bearing 62. Rocking movement of the yoke member 58 about the axis of the cylinder shaft 60 will impart rotation of the cylinder 61 within the bearings 62. The spring 64 imparts a continuous outward force upon the yoke and consequently the roller 21, when the belt 12 is mounted on its supporting rollers thereby placing the belt under slight tension during operation. The structural connection between the yoke member and the portion 63 is slightly loose in order to allow very limited play between these parts to correct for slight edge to edge circumferential variations in the belt 12.

Means are provided for retracting the roller 21 inwardly of the belt assembly to permit the easy removal and mounting of a belt upon the assembly. To this end, the inner end of the cylinder 61 is connected to a quick-acting toggle arrangement which will draw the cylinder inwardly so as to carry the roller 21 therewith to a retracted position. The toggle arrangement also serves to retain the yoke member 58 and roller 21 in the belt assembly.

The upper part of the cylinder shaft 61 is formed with a tubular extension 71 axially aligned therewith. Suitable openings are formed in the sleeve in diametrically opposed positions for supporting a pin 72 which pivotally connects one end of a link 73 to this end of the cylinder 61. The link 73 is pivotally connected at its other end to one end of another link 74 having its opposite end pivotally connected to the frame structure 42. It will be apparent that the links 73, 74 and their respective connections form a toggle device which when actuated into alignment will cause the cylinder 61 to move outwardly and when actuated into a buckled condition will cause the cylinder to be retracted inwardly. These actuations of the toggle links are produced by a drive link 75 which is pivotally connected at one end to the pivot connection between the links 73, 74 and extends transverse of the belt assembly, through the outer wall 24 therefor and ending in a pivotal handle 76 for actuating the link 75 axially for causing actuation of the toggle 73, 74 in either of its two operating conditions. In order to remove or to replace a belt 12, the handle 76 is suitably manipulated to cause buckling of the toggle links 73, 74, which action draws the cylinder 61 inwardly to retract the roller 21. This forms sufficient slack in the belt as to permit an operator to move a belt easily relative to the rollers 20, 21 and 22. After a belt is placed on these rollers for machine operation, the handle 76 is manipulated in the opposite direction in order to place the links 73, 74 in their aligned condition, as shown in FIG. 4, for forcing the roller 21 against the belt 12 and locking the roller in this position. In this operation, the spring 64 serves as an overdrive and, as previously mentioned, as a tensioning means for the belt. There is another overdrive function for this spring, as will be described below.

As shown in FIGS. 2 and 4, the axis of the shaft 60 (cylinder 61 and the portion 63) is perpendicular to the axis of the roller 21 and in the same plane therewith. This plane, also substantially bisects the angle between the planes of the belt runs between the roller 21 and each of the rollers 20 and 22. In the event the belt 12 starts to skew, in other words, to deviate from its predetermined set position with respect to all of its guide rollers, the resultant lateral movement of the belt will be sensed by a sensing arrangement to be described below, and this will result in positive action being utilized to skew or rock the roller 21 about the axis of the shaft 60 for returning the belt back to its original predetermined working position. This control skew is a tracking action and will effect an angular relationship of the roller 21 relative to the direction of movement of the belt thereby causing the same to steer or follow the roller surface and be displaced laterally in order to return the belt back to a centered position rather than exerting pressure on the belt adjacent one edge portion thereof. In this manner, pressure is applied equally to all portions of the belt affected during tracking action thereby minimizing the tendency of the tracking arrangement to adversely affect belt structure by exerting undue pressures of the belt structure adjacent one edge or the portion between the mid-line of the belt and one edge. With the axis of pivoting of the roller 21 lying on the bisecting plane for the planes of the photoreceptor belt runs, the deflection of the ends of the roller occurs in opposite direction to provide maximum belt correction with minimum roller skewing. Preferably the roller 21 is covered with a rubber coating which will prevent slippage of the belt as it steers during tracking. During rocking of the shaft 55, both edges of the belt are affected equally and, as the skewing increases during tracking action, any tendency of the belt to lessen in circumference will cause movement of the roller 21 inwardly against the tension of the spring 63 which serves as an overdrive or a shock absorber for tracking action.

In the event that the belt 12 is removed and a new one applied to the belt assembly which has a slightly larger or smaller circumference, the spring 63 will always maintain the same pressure of the roller 21 upon the belt thereby insuring the same tension upon a belt regardless of its circumferential size. The arrangement also eliminates any two directional forces being applied to the belt which could have a destructive effect upon the relatively thin film of the photoconductive material on the belt. In addition, with the axis of the roller 21, lying on the bisecting plane of the angle between the adjacent belt runs during rocking movement of this roller, there is a minimum of deflection, caused by skewing of the belt, along the exposure belt run between the rollers 20, 21 thereby minimizing the effect of belt skewing upon the imaging abilities on this run during an exposure of an original.

Sensing means are provided in the belt assembly 14 in order to initiate controlled instantaneous rocking of the shaft 55 for the roller 21 in either direction depending upon the direction of slipping of the belt axially relative to the shafts of the rollers 20, 21, 22. Deviation of the belt is initially detected by a flat ring 80 encircling one end of the shaft 81 which supports the roller 20 for rotation in the belt assembly. The shaft 81 is preferably hollow and is rotatably mounted at each end in bearings 82 mounted in the end walls 24, 25. The ring 80 is preferably made of wear-resistant plastic material which will not become damaged when in contact with the relatively sharp edge of the belt 12, and yet will not cause fraying or other damage to the co-acting edge of the belt. The ring 80 is mounted for rotation, which occurs during contact with the belt, in order to minimize wear of the ring. Rotation is accomplished by means of a ball bearing device comprising an inner race 83 to which the ring 80 is axially aligned and secured and an outer race 84 which is secured to a circular plate 85 on a sensing support structure for the ring 80. For ease of use, the plate 85 is formed with a central opening 86 which allows the assembled structure comprising the ring 80, the races 83, 84 and the plate 85 to accommodate and avoid the adjacent end of the shaft 81 and allow the ring 80 to engage the edge of the belt 12.

The support plate 85 is secured to curved arm 87 which in turn is integral with the upper end of an angularly inclined shaft 88 mounted for rotation along its longitudinal axis within a fixed cylindrical casting 89. Spaced brackets 90 integral with the casting 89 are mounted by screws to the frame structure 42 for the belt assembly. Suitable bearings (not shown) are utilized within the casting between the same and the shaft 88 in order to facilitate the rotating relationship between these elements. At the lower end of the shaft 88, there is formed a reduced portion 91 which is rotatable with the shaft and to which is attached an element 92 extending perpendicular relative to the axis of the shaft so to swing in either direction upon corresponding rotative movement of the shaft. The element 92 is pivotally connected to a link member 93 which in turn is connected to an ear 94 formed at one end of the yoke member 58. It will be apparent from the foregoing description that the roller 21 is adapted for rocking movement in at least one direction when the sensing ring 80 is moved outwardly, or in that direction away from the adjacent end of the roller 20. Upon this motion of the sensing ring, the shaft 88 is rotated about its axis due to its connection to the ring by way of the arm 87. The corresponding rotation of the shaft 88 will impart a swinging movement to the element 92 which will cause movement of the link 93, and consequently the rocking yoke member 58 for producing the same motion on the tracking roller 21. This final action on the roller, which is relatively slight, will effect movement of the belt away from the ends of the rollers 20, 21 and 22 which are adjacent the side of the belt assembly to which the sensing ring 80 is positioned. In the event the ring 80 is moved toward the adjacent end of the roller 20, the roller 21 will be rocked in a direction that causes the belt to track toward the above referred to ends of the rollers.

Figure 3:
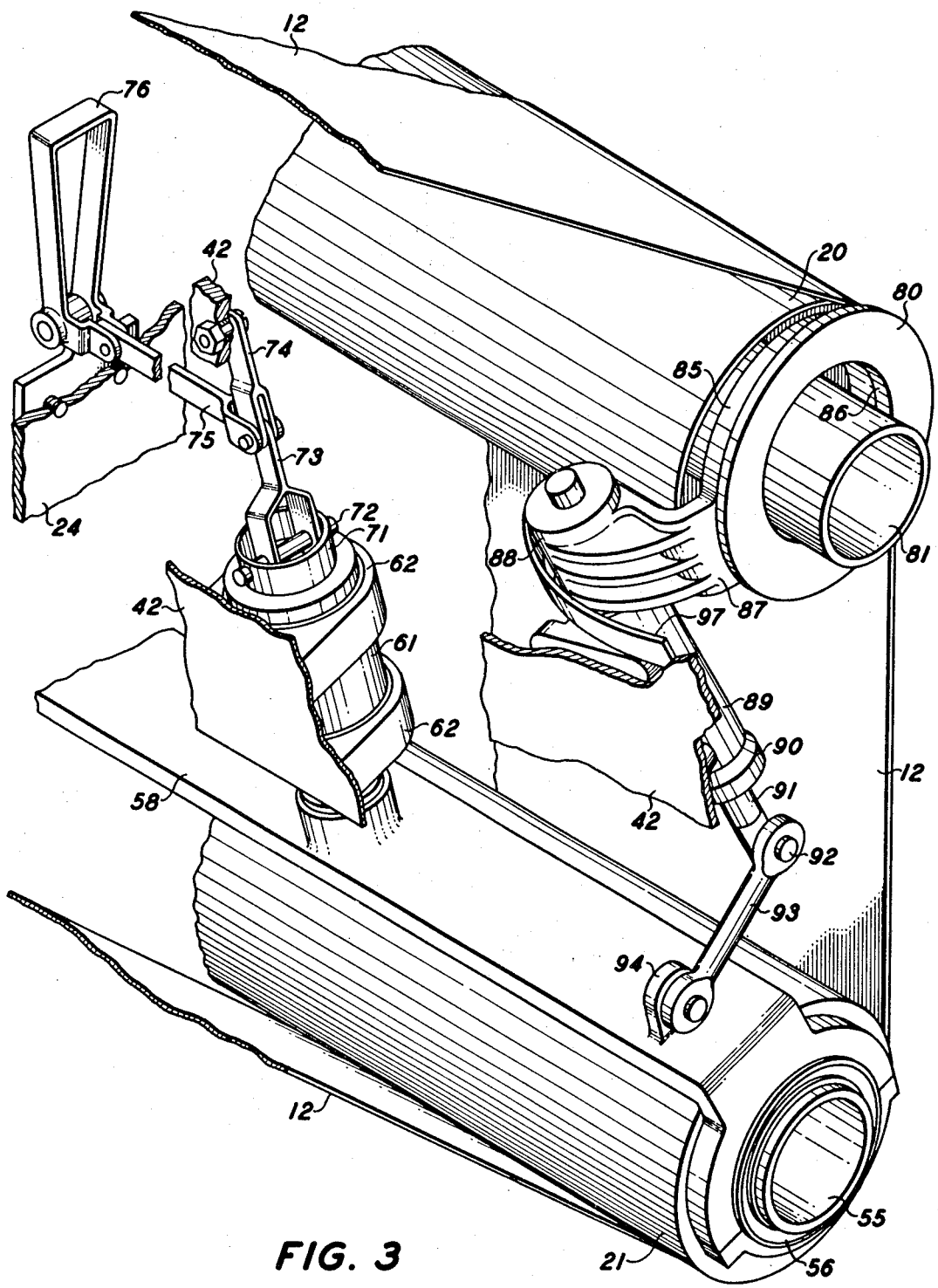
FIG. 3 is an isometric view of a portion of the belt assembly as seen from the front of the machine.

Movement of the sensing ring 80 in either direction in order to produce rocking of the tracking roller 21 in either direction and thereby cause tracking of the belt 12 in a direction which is opposite that in which the sensing ring moves occurs when the edge of the belt 12 deviates from a predetermined position relative to the guide rollers which support. For accurate alignment and positioning of electrostatic latent images and then corresponding developed images with respect to the processing stations of the printing machine, it is necessary that the photoreceptor belt maintain a constant and predictable path of movement. In the event the belt deviates from a prescribed path of movement, say in the direction inwardly of the frame structure 28, the edge of the belt will engage the surface of the sensing ring 80 and cause corresponding movement of the ring toward the frame structure, or toward the right as viewed in FIG. 3. The amount and rate of this movement of the ring is consonant with the amount and rate of deviation of the belt. As described above, with the sensing ring being moved in this manner, the tracking roller 21 will be rocked in order to cause a counter tracking of the belt so as to restore the belt to its original predetermined path of movement. Deviation of the belt in the other direction, that is, away from the frame 28, the sensing ring will follow the away-moving edge of the belt in order to produce rocking of the tracking roller in a direction which will stop the deviation of the belt and to return it to its predetermined path. A light leaf spring 97 having one end secured to the arm 87 and its other end maintained under slight tension against the frame 42 provides a slight force upon the ring 80 in a direction toward the sensed edge of the belt in order to overcome the frictional forces in the sensing mechanisms and to insure that the ring will follow the edge if it deviates away from the ring.

The sensing arrangement and belt deviation control described above allows correction of belt deviation in either direction by positively actuating countermeasures in either direction, and to accomplish this control from only one edge of the belt. There is no need to utilize a constant spring force or the equivalent which normally causes the movement of the belt in one direction by force the rocking a yoke member in one rotation and to positively drive the belt in the opposite direction so as to maintain the desired positioning of the belt. There is also no need for using two belt sensing mechanisms, one for each belt edge. The above described sensing and control arrangement provides a double-acting single sensing control.

In addition, the sensing of belt deviation is accomplished at one roller and the actual tracking is produced at another roller, the next roller positioned downstream of belt movement. In this manner, the time lag for correction of belt deviation is almost nil with only a portion of the belt experiencing a deviation. There is no need for a full circumferential movement of the belt before correction is imposed, as is the case wherein sensing and correction occurs at the same roller.

Figure 5:
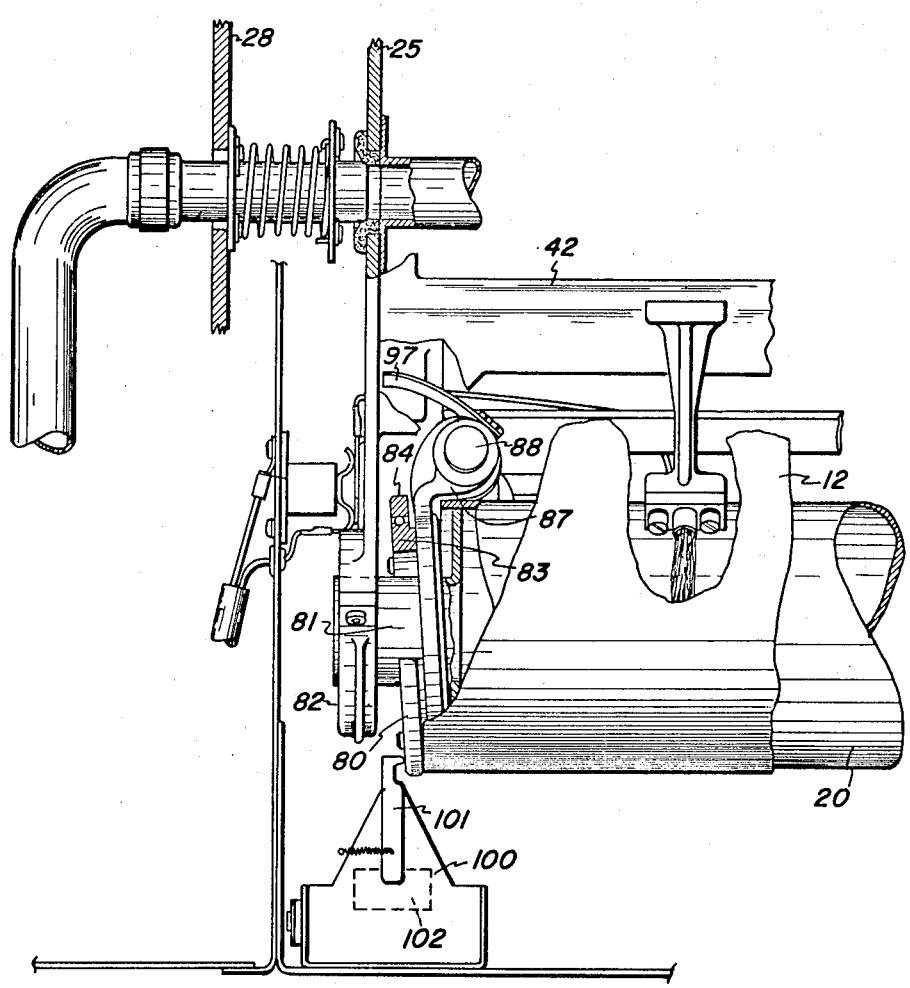
FIG. 5 is a sectional view of a detail of the belt tracking system.

As previously stated, wearing of the relatively delicate sensed edge of the photoreceptor belt is held to a minimum by the use of a sensing ring that is mounted for rotation along with and while in contact with the edge. In FIG. 5, the ring 80 is shown to have inner and outer diameters which provide a relatively large and long surface area for the edge to engage and to do so without slipping off the ring or to miss it entirely. Wearing of the sensed edge is also held to a minimum by virtue of the arrangement wherein edge sensing occurs at a roller which has its axis fixed, such as the roller 20, and whereat the belt is relatively stiff in a transverse direction so that it will not be able to buckle or curl when it engages a sensing element. Sensing between rollers where the belt may be unsupported in a transverse line with a sensing element in the path of lateral movement of the sensed edge as it deviates may result in a curling or buckling of the belt as it contacts the element and before it has sufficient stiffness force to produce movement of the sensing element. This will result in a sensing activity that lacks sensitivity, predictability and accuracy. In order to take advantage of the relative transverse stiffness of the photoreceptor belt on the roller 20, the sensing element takes the form of the flat ring 80 which encircles the shaft for the roller at which sensing occurs and which has a mean diameter approximately equal to the diameter of the arc of the belt as it travels around the roller. It will also be noted that the plane of the sensing surface of the ring 80 is slightly canted thereby assuring that contact with the sensed edge of the belt always occurs at the same place relative to the adjacent end of the roller 20 and the ring 80. With the ring 80 being mounted on the inner race of a ball bearing assembly, the ring will rotate and along with the edge of the belt when the same contacts the ring.

In order to prevent extreme lateral deviation of the belt during machine use, there is provided a protection shut-off circuit (not shown) which is connected to the main power source to the machine for shutting it down with the occurrence of this sort of deviation and a switch mechanism 100 actuable in response to extreme belt deviation. The switch mechanism includes a switch arm 101 in engagement with the support plate 85 for the sensing ring 80 and which serves to actuate a suitable double acting switch 102 in the mechanism 100. This mechanism along with the arm 101 is set to actuate the switch 102 to open the machine power circuit in the event the arm 101 is deflected in either direction beyond predetermined set limits, in response to movement of the sensing ring 80 in either direction beyond prescribed limits. Such extreme deviation may be caused by belt failure or sudden obstructions to its path of movement such as by a sheet of paper being carried around with the belt, or failure in the structure of the belt assembly.

While the invention has been described with reference to the structure disclosed, it is not confined to the details set forth; but is intended to cover such modifications, or changes as may come within the scope of the following claims.

What is claimed is:

1. A tracking apparatus for use with an assembly of a plurality of rolling members for guiding and supporting flexible material for movement around one of said rolling members and with the axes of the rolling members substantially in parallel comprising
    means for rotatably supporting one of said rolling members about its axis of rotation,
    means for pivotally mounting said one rolling member about a pivotal axis substantially normal to said axis of rotation and lying in a plane bisecting the angle between the planes of said runs of the material on either side of said one rolling member,
    and control means responsive to deviating lateral movement of the material at another of said rolling members for pivotally rotating said one rolling member about said pivotal axis to effect the lateral movement of the material in a direction opposite the said deviating movement.

2. The apparatus of claim 1 wherein said means for supporting said one rolling member is a yoke member formed with an extension element having its axis in coincidence with said pivotal axis and which supports the yoke member in the assembly.

3. The apparatus of claim 1 including means operatively connected to said one rolling member for normally exerting a force on said one rolling member tending to enlarge the flexible material thereby producing tension thereon.

4. The apparatus of claim 1 wherein said control means includes a sensing element engageable with one edge of the material for sensing the position thereof relative to said prearranged path.

5. A tracking apparatus for use with an assembly of a plurality of rolling members for guiding and supporting flexible material for movement and with the axes of the rolling member substantially in parallel and wherein at least one of the rolling members has a shaft rotatably supporting the same comprising
    means for rotatably supporting the shaft of said one rolling member about its axis of rotation,
    means for pivotally mounting said one rolling member about a pivotal axis,
    and control means responsive to deviating lateral movement of the material at another of said rolling members for pivotally rotating said one rolling member about said pivotal axis to effect the lateral movement of the material in a direction opposite the said deviating movement, said one rolling member being positioned downstream in the direction of movement of the belt relative to said other rolling member.

6. The apparatus of claim 5 wherein said material is in the form of an endless belt and said means for pivotally mounting said one rolling members is a yoke member.

7. The apparatus of claim 5 wherein the material is in the form of an endless belt and said one rolling member immediately follows said other rolling member in said direction of movement.

8. A tracking apparatus for use with an assembly of rolling members having at least one roller for guiding a web of flexible material for movement and wherein the roller has a shaft rotatably supporting the same comprising means for rotatably supporting said shaft of the roller about its axis of rotation, a sensing device arranged for sensing the positioning of one edge of the web during the guiding thereof by said roller, means responsive to deviating lateral movement of said edge of the web in either direction relative to a predetermined desired position for producing lateral movement of the web in a direction opposite the said deviating movement.

References Cited
UNITED STATES PATENTS

| 3,435,693 | 4/1969 | Wright | 198—202 |
| 3,301,384 | 1/1967 | Sowards | 198—202 |

RICHARD E. AEGERTER, Primary Examiner

U.S. Cl. X.R.

74—241